US007607377B1

(12) United States Patent
Greenwald

(10) Patent No.: US 7,607,377 B1
(45) Date of Patent: Oct. 27, 2009

(54) AXIAL ALIGNMENT MECHANISM WITH ISOLATED SLANT DISKS

(75) Inventor: Christopher L. Greenwald, Waban, MA (US)

(73) Assignee: Pro-Cut Licensing Company, LLC, West Lebanon, NH (US)

( * ) Notice: Subject to any disclaimer, the term of this patent is extended or adjusted under 35 U.S.C. 154(b) by 0 days.

(21) Appl. No.: 12/277,645

(22) Filed: Nov. 25, 2008

(51) Int. Cl.
*B23Q 1/25* (2006.01)
*B23B 33/00* (2006.01)

(52) U.S. Cl. .......................................... 82/170; 82/151
(58) Field of Classification Search ................... 82/170, 82/151, 150, 155, 167, 166, 112, 165; 451/290; 279/142, 143, 145, 157, 156
See application file for complete search history.

(56) References Cited

U.S. PATENT DOCUMENTS

| | | | | |
|---|---|---|---|---|
| 2,655,829 A * | 10/1953 | Fiorino | ........................ | 82/165 |
| 3,158,382 A * | 11/1964 | O'Neill | ...................... | 279/123 |
| 4,165,662 A * | 8/1979 | Besenbruch et al. | .......... | 82/112 |
| 5,183,272 A * | 2/1993 | Tyvela | ........................ | 279/156 |
| 5,648,881 A * | 7/1997 | Yokouchi | .................. | 360/99.04 |
| 5,992,278 A * | 11/1999 | Rimlinger, Jr. | ............... | 82/165 |
| 6,101,911 A | 8/2000 | Newell et al. | | |
| 6,212,981 B1 * | 4/2001 | Brinker et al. | ............... | 82/1.11 |
| RE37,791 E * | 7/2002 | Yokouchi | .................. | 360/99.08 |
| 6,626,073 B1 * | 9/2003 | Cunningham et al. | ......... | 82/112 |

\* cited by examiner

*Primary Examiner*—Will Fridie, Jr.
(74) *Attorney, Agent, or Firm*—Michael J. Weins; Jeffrey E. Semprebon

(57) ABSTRACT

An alignment mechanism that employs two slant disks to adjust alignment between the axes of rotation of a lathe spindle and a wheel hub has a float plate positioned between the slant disks. Rotation of the float plate is limited with respect to a base, which affixes to the lathe spindle, and a cap, which affixes with respect to the wheel hub. Limiting rotation of the float plate prevents transfer of torque from one slant disk to the other when one slant disk is rotated with respect to the base and the cap by an alignment adjustment system to vary the angle and orientation of the misalignment between the two axes. Preventing such transfer of torque allows each of the slant disks to be independently adjusted by the alignment adjustment mechanism without applying a drag force to the slant disk.

10 Claims, 6 Drawing Sheets

AXIAL ALIGNMENT MECHANISM WITH ISOLATED SLANT DISKS

FIELD OF THE INVENTION

The present invention relates to alignment mechanisms such as are employed in on-vehicle disk brake lathes to adjust the alignment between a spindle axis of the lathe and a hub axis that is the axis of rotation of a disk to be machined by the lathe.

BACKGROUND OF THE INVENTION

Axial alignment mechanisms are employed in on-vehicle disk brake lathes to connect between a spindle of the lathe and a hub adapter that mounts to a wheel hub on which a brake disk to be machined is also mounted. The alignment mechanism is adjustable in order to substantially align a spindle axis, which is the axis about which the lathe spindle rotates, with a hub axis, about which the wheel hub and brake disk rotate. Substantially aligning the spindle axis with the hub axis avoids introducing lateral runout in the brake disk when its surfaces are machined in a direction normal to the spindle axis. One mechanism that is well-suited for use with an automatic alignment system uses a pair of opposed slant disks to adjust the magnitude and orientation of the angle of misalignment to compensate for misalignment in the elements interposed between the spindle and the wheel hub. Such an alignment mechanism 10 is shown in FIGS. 1 and 2, adjusting the alignment of a lathe spindle 12 and a hub adapter 14 (shown in FIG. 2) to substantially align a spindle axis 16, about which the lathe spindle 12 rotates, with a hub axis 18, about which the hub adapter 14 rotates.

The alignment mechanism 10 has a base 20 for affixing to the lathe spindle 12 and a cap 22 for mounting against the hub adapter 14, and the adjustment is made by varying the positions of a first slant disk 24 and a second slant disk 26 that are interposed between the base 20 and the cap 22 and which each have side surfaces that are inclined with respect to each other. A torque transfer post 28 extending from the base 20 engages a post recess (not shown) on the cap 22 to prevent rotation therebetween; this allows the base 20, which is driven by the lathe spindle 12, to in turn drive rotation of the cap 22, while allowing a limited degree of non-rotational motion to accommodate the adjustment of the alignment. The cap 22 in turn has a pair of lug recesses 30, one of which is engaged by a lug 32 on the hub adapter 14 to allow the cap 22 to drive rotation of the wheel hub to which the hub adapter 14 is attached.

Ring bearings are interposed between the elements to allow independent rotation of the two slant disks (24 and 26). A base ring bearing 34 is interposed between the base 20 and the first slant disk 24, a central ring bearing 36 is interposed between the first slant disk 24 and the second slant disk 26, and a cap ring bearing 38 is interposed between the second slant disk 26 and the cap 22. The ring bearings (34, 36, 38) and the slant disks (24, 26) are maintained in axial alignment by a centering cylinder 40 provided on the base 20.

To retain the elements of the alignment mechanism 10 together, a retention ring 42 is provided, which attaches to a sleeve 44 extending from the base 20 and forcibly engages the cap 22 via a wave spring 46. The wave spring 46 applies pressure to maintain the base 20, the ring bearings (34, 36, 38), the slant disks (24, 26), and the cap (22) in contact and assures that they remain in proper position relative to each other.

When the alignment mechanism 10 is in service, a drawbar assembly 48 (only partially shown) engages the hub adapter 14 and the lathe spindle 12 and operates to force the hub adapter 14 toward the lathe spindle 12, thereby forcibly engaging together the base 20, the ring bearings (34, 36, 38), the slant disks (24, 26), and the cap (22). The ring bearings (34, 36, 38) allow the slant disks (24, 26) to be rotated even when the elements are forcibly engaged together.

The first slant disk 24 and the second slant disk 26 are individually driven by an alignment adjustment system that allows the driven slant disk (24 or 26) to be incrementally moved with respect to the base 20 and the cap 22. If the non-driven slant disk (26 or 24) does not track the motion of the driven disk (24 or 26), this incremental motion serves to adjust the magnitude of the angle of misalignment between the spindle axis 16 and the hub axis 18 and to adjust the orientation of this angle about the spindle axis 16. Such adjustment of alignment using slant disks is taught in U.S. Pat. No. 6,101,911, and is typically done incrementally in a trial-and-error method, with each adjustment evaluated as to whether it increases or decreases the misalignment, and further adjustments being made accordingly.

The alignment adjustment system for use with the alignment mechanism 10 employs a series of spur gears 50 that are each rotatably mounted with respect to the base 20 and configured to engage peripheral teeth 52 on one of the slant disks (24, 26), as shown in FIGS. 1 and 2, to drive the slant disks (24, 26) of the alignment mechanism 10. Each of the spur gears 50 is operably connected to a star wheel 54 such that rotation of the star wheel 54 causes rotation of the spur gear 50 operatively connected thereto, and in turn rotation of the slant disk (24, 26) engaged by the spur gear 50 either in a first direction, when the spur gear 50 is directly connected to the associated star wheel 54 so as to rotate therewith, or in a second and opposite direction when the spur gear 50 is connected to the associated star wheel 54 through an idler gear 56 so as to rotate in a direction opposite that of the star wheel 54. The alignment adjustment system employs a solenoid (not shown) such as described in the '911 patent to selectively rotate the star wheels 54 in one direction to adjust the alignment.

While the ring bearings (34, 36, 38) allow each of the slant disks (24, 26) to be driven independently, independent rotation does not necessarily follow. Coupling of the rotation of the two slant disks (24, 26) has been found to occur, since the compression forces on the stacked elements provided by the drawbar assembly 48 result in frictional forces associated with the central ring bearing 36. As a result of these frictional forces, as one slant disk (24 or 26) is rotated, torque is transmitted through the central ring bearing 36 to the other slant disk (26 or 24), causing it to rotate as well. Such rotation of the other slant disk impairs the ability to individually rotate each of the slant disks (24, 26) to make adjustments in their relative positions. To reduce such coupling of the rotation, a drag force is applied to the slant disk gears by friction disks 58 interposed between each of the star wheels 54 and the base 20. These friction disks 58 become compressed when the star wheel 54 is mounted to the base 20, and the compression causes a frictional resistance to rotating the star wheel 54. While such has been found effective, the drag on the star wheels 54 requires the alignment adjustment system to apply a greater force to rotate the star wheels 54 when making adjustments in the alignment, and thus requires a greater size and weight of the alignment adjustment system. The greater force needed also accelerates wear on the star wheels.

SUMMARY

The present invention is for an alignment mechanism for use in an on-vehicle disk brake lathe which, in combination with an alignment adjustment system, adjusts the alignment between a spindle axis of a lathe spindle and a hub axis about which a wheel hub rotates, the hub having a brake disk to be machined mounted thereto. The alignment mechanism attaches between the lathe spindle and a hub adapter that in turn is attached to the hub.

The alignment mechanism has a base for attachment to the lathe spindle. The base has a base bearing-engaging surface and a base mounting surface for placement against the spindle when the base is mounted thereto.

A first slant disk is provided, which is bounded by a first indexable ring for engagement by the alignment adjustment system that forms part of the on-vehicle disk lathe, and is also bounded by a pair of planar first disk side surfaces which are inclined with respect to each other by a first disk angle $\alpha_1$. Examples of alignment systems employing such slant disks, and where the indexable ring are formed by peripheral teeth on the slant disks, are further described in U.S. Pat. No. 6,101,911, incorporated herein by reference. The first slant disk is interposed between a pair of first disk ring bearings with each of the first disk ring bearings being in contact with one of the first disk side surfaces. In service, the slant disk is positioned with respect to the base such that one of the first disk ring bearings resides in contact with the base bearing-engaging surface of the base.

A float plate is provided, which resides in contact with the one of the first disk ring bearings that is not in contact with the base.

A second slant disk is provided that is bounded by a second indexable ring for engagement by the alignment adjustment system, as well as being bounded by a pair of planar second slant disk side surfaces which are inclined with respect to each other by a second disk angle $\alpha_2$ which should be similar in magnitude to the first disk angle $\alpha_1$. The second slant disk is interposed between a pair of second disk ring bearings with each of the second disk ring bearings being in contact with one of the second disk side surfaces. The second slant disk is positioned such that one of the second disk ring bearings contacts the float plate.

A cap is provided for attachment to the hub adapter. The cap is provided with a cap bearing-engaging surface and is positioned such that the cap bearing-engaging surface is in contact with the one of the second disk ring bearings that is not in contact with the float plate. The cap also has a cap mounting surface for placement against the hub adapter when the cap is mounted thereto.

A centering structure is provided to provide axial alignment of the base, the first slant disk and the associated first disk ring bearings, the float plate, the second slant disk and the associated second disk ring bearings, and the cap.

Means for limiting rotational motion between the base, the float plate, and the cap are provided. Since the float plate is positioned between the slant disks, limiting rotation of the float plate relative to the base and the cap blocks transmission of torques from one slant disk to the other, and thus eliminates the need to apply a drag force on each of the slant disks and thereby eliminates the problems associated with providing such drag forces. Limiting rotation between the base and the cap allows the base, which is attached to the lathe spindle, to drive rotation of the cap, which in turn drives the hub adapter and the hub attached thereto so as to rotate the brake disk mounted to the hub during the machining process.

To maintain the elements of the alignment mechanism in position, the cap can be provided with a wave spring that bears against a cap plate and against an element which attaches to the base, thereby compressing the wave spring and forcing the cap plate towards the base to apply a compressive load on the elements positioned therebetween.

The cap and the base can be configured to form a case which encloses the slant disks and the float plate. The alignment adjustment system can employ spur gears that reside within the case and engage peripheral teeth on the slant disks, these peripheral teeth providing the indexable rings. The spur gears are attached to spur gear shafts which pass through the case and engage star wheels, which in turn are acted upon by additional elements of the alignment adjustment system. The base can be provided with a ledge configured with wells into which the spur gears reside in part, bottoms of the wells serving to support the spur gears so that they align with the peripheral teeth on the slant disks. A spacer that seats against the ledge can be provided to support the spur gears to prevent them from sliding out of engagement during service.

DETAILED DESCRIPTION

Figure 3:
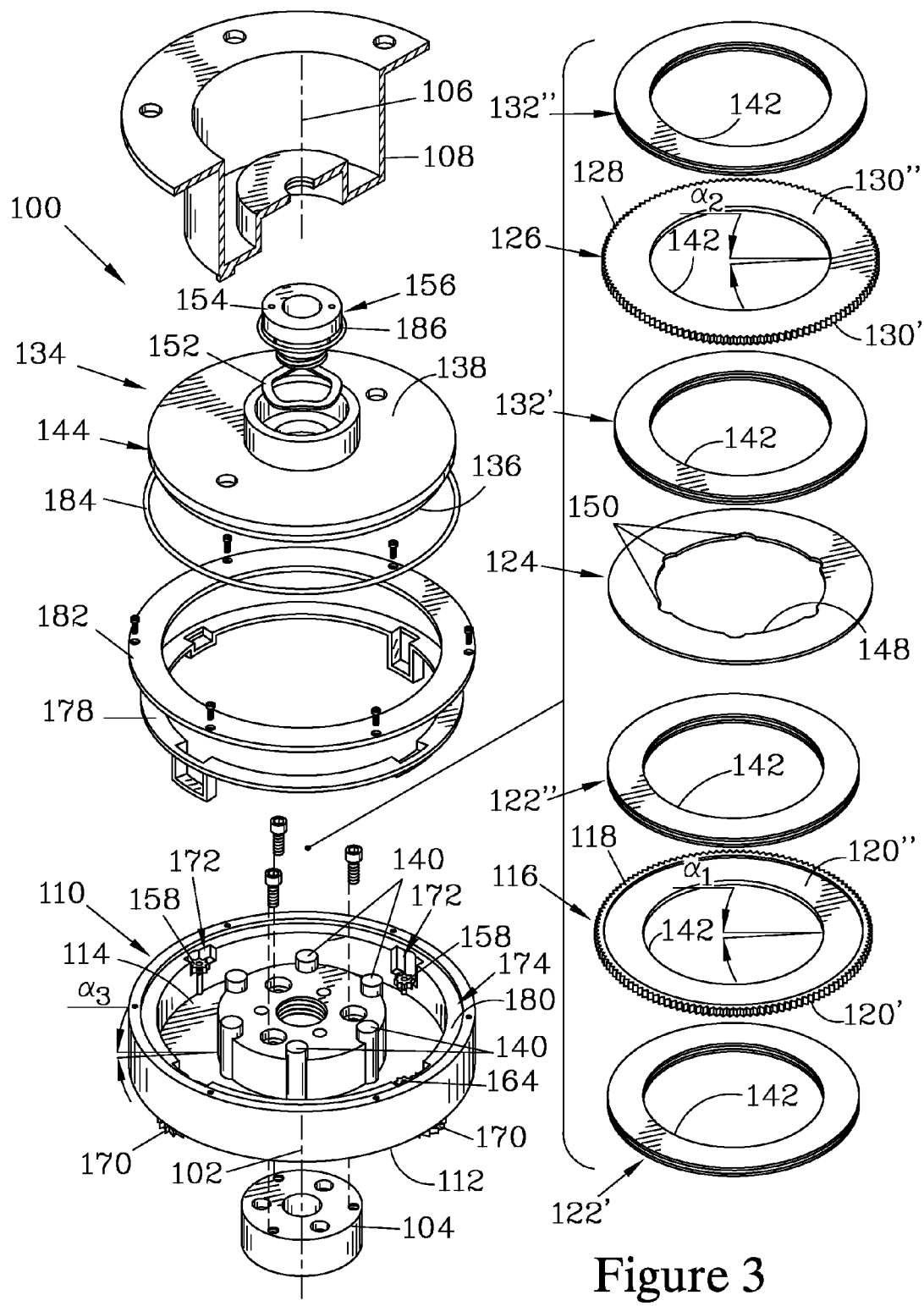
FIG. 3 is an exploded isometric view showing one embodiment of the present invention, which employs a float plate positioned between the slant disks, and employs a pair of ring bearings for each slant disk, positioned on either side thereof. The float disk is essentially prevented from rotating relative to the base, and thus blocks any transfer of torque from one slant disk to the other. Rotation of the float plate is limited by an array of cylindrical shafts that engage notches in the float plate. These shafts are also employed to provide the centering structure for the ring bearings and the slant disks to maintain their alignment, and engage recesses in the cap to limit rotation between the cap and the base.
Figure 4:
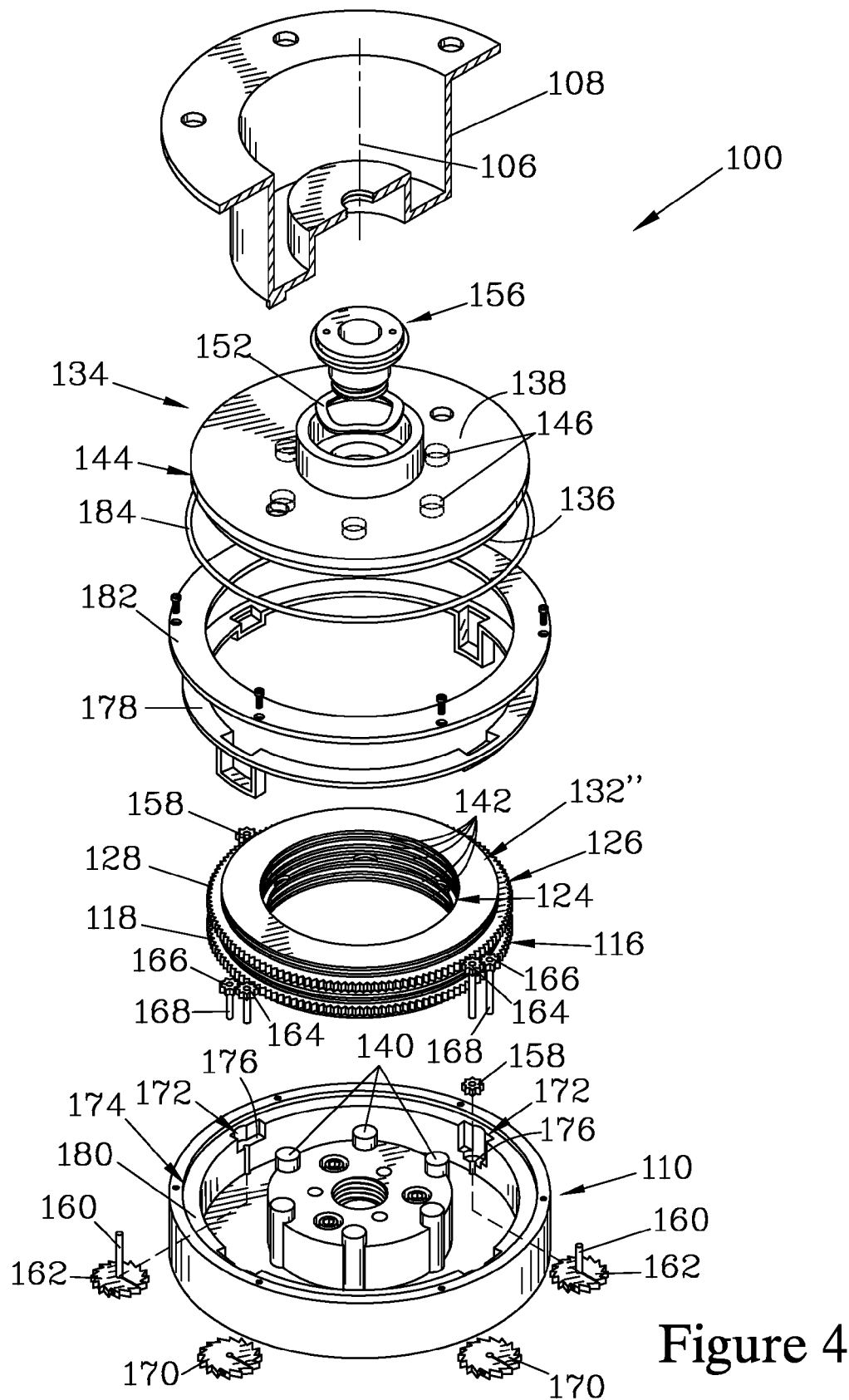
FIG. 4 is a partially exploded view of the embodiment shown in FIG. 3, better illustrating an arrangement of spur gears that engage peripheral teeth that serve as indexable rings on the slant disks to allow the slant disks to be selectively rotated. The base is configured with wells that support the spur gears, and a spacer also constrains the positions of the spur gears to maintain them engaged with the indexable rings on the slant disks.
Figure 5:
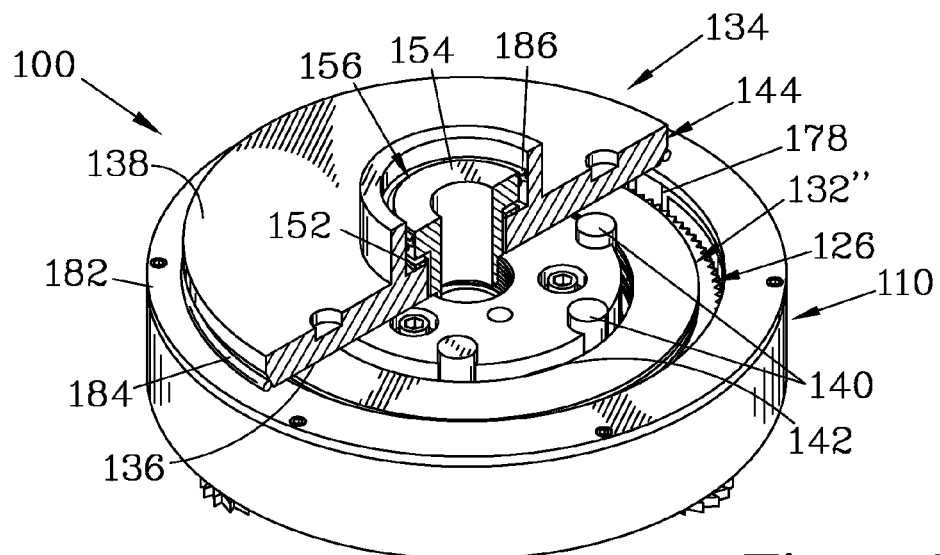
FIG. 5 is a partially sectioned view of the alignment mechanism shown in FIGS. 3 and 4, better showing the structure of the cap. The cap is an assembly which includes a cap plate and a terminating post that threadably engages the base. The terminating post has a head that compresses a wave spring interposed between the head and the cap plate, this compression serving to apply a compressive load between the cap plate and the base to maintain them, as well as the elements interposed therebetween, in their relative positions.

FIGS. 3 and 4 are isometric views of an alignment mechanism 100 that forms one embodiment of the present invention. FIG. 3 is an exploded view of the alignment mechanism 100 that serves to adjust the alignment between a spindle axis 102 of a lathe spindle 104 of an on-vehicle brake disk lathe and a hub axis 106 of an axle on which a disk brake (not shown) rotates. FIG. 4 is another isometric view of the same structure, which is partially exploded. As illustrated in FIG. 3, the alignment mechanism 100 connects between the spindle 104 of the on-vehicle disk lathe and a hub adaptor 108 which in turn attaches to a hub (not shown) mounted on the axle on which the disk brake is mounted. The axial alignment system 100 illustrated in FIGS. 3 through 5 is designed to operate in conjunction with an alignment adjustment system such as those further described in U.S. Pat. No. 6,101,911. The alignment mechanism 100 has a base 110 having a base mounting surface 112 which attaches to the lathe spindle 104 and a base bearing-engaging surface 114.

A first slant disk 116 is provided, which is bounded by a first ring gear 118 that provides a first indexable ring, and by a pair of first disk side surfaces 120 which are inclined with respect to each other by an angle $\alpha_1$. When assembled for service, the first slant disk 116 is positioned such that one of the first disk side surfaces 120' is in contact with one of two first disk ring bearings 122', which in turn is in contact with the base bearing-engaging surface 114 of the base 110. The other of the first disk side surfaces 120" is in contact with the other of the first disk ring bearings 122" when the alignment mechanism 100 is assembled, and this other first disk ring bearing 122" in turn contacts a float plate 124.

A second slant disk 126 is provided, which is bounded by a second ring gear 128 that provides a second indexable ring, and by a pair of second disk side surfaces 130 which are inclined with respect to each other by an angle $\alpha_2$. The angles $\alpha_1$ and $\alpha_2$ should be about equal to each other, and should be selected such as to each be at least equal to the largest expected angle of misalignment between the axes (102, 106); typically, these angles ($\alpha_1$, $\alpha_2$) measure a fraction of a degree. When assembled for service, the second slant disk 126 is positioned such that one of the second disk side surfaces 130' is in contact with one of a pair of second disk ring bearings 132' that in turn is in contact with the float plate 124, while the other of the second disk side surfaces 130" is in contact with the other of the second disk ring bearings 132".

A cap assembly 134 is provided for attaching to the hub adaptor 108. The cap assembly 134 has a cap bearing-engaging surface 136 which engages the one of the second disk ring bearings 132" that is not in contact with the float plate 124, and a cap mounting surface 138 for mounting against the hub adapter 108.

In order to assure cooperative action between the base 110, the first slant disk 116, the pair of first disk ring bearings 122, the float plate 124, the second slant disk 126, the pair of second disk ring bearings 132, and the cap assembly 134, an array of shafts 140 are provided to serve as a centering structure. The shafts 140 are tangent to an inscribed circle, the diameter of which is slightly less than the diameter of a central passage 142 through each of the slant disks (116, 126) and the ring bearing pairs (122, 132). The shafts 140 are imbedded in the base 110 and non-rotatably engage a cap plate 144 which forms part of the cap assembly 134. The cap plate 144 is provided with an array of recesses 146 (shown in hidden lines in FIG. 4) that are positioned and configured to slidably engage the shafts 140 when the cap assembly 134 is in place, thereby providing a transfer of torsional loads between the base 110 and the cap plate 144 to assure that the cap plate 144 and the base 110 rotate as a unit, while allowing adjustment of the inclination of the cap plate 144 with respect to the base 110.

The float plate 124 of the axial alignment mechanism 100 has a plate central passage 148, slightly smaller than the passage 142, that has a series of notches 150 configured such that they slidably engage the shafts 140 such that the shafts 140 act as blocking elements that allow limited degree of tilting of the float plate 124 but restrict rotation thereof, thereby isolating the rotational movement between the two slant disks (116, 126). Such is not the case of the axial alignment mechanism 10 or the alignment devices taught in the '911 patent. In fact, the lack of isolation in earlier alignment mechanisms requires a drag mechanism to be introduced to limit any coupling of the motion between the two slant disks. Maintaining the motion of the slant disks (116, 126) separate is critical to providing adjustments to allow the hub axis 106 to be aligned with the spindle axis 102. It was for this reason that friction pads 58 were imposed between the base 20 and the star wheels 54 in the prior art alignment mechanism 10.

It has been found that in many circumstances the alignment process can be speeded by reducing the adjustments needed in the relative positions of the slant disks (116, 126) if a third angle $\alpha_3$ is introduced in the stacked elements. The angle $\alpha_3$ should be similar in magnitude to the angles ($\alpha_1$, $\alpha_2$), and can be conveniently provided by forming the base bearing-engaging surface 114 inclined with respect to the associated base mounting surface 112 by the angle $\alpha_3$ (as illustrated in FIG. 3), or by forming the cap bearing-engaging surface 136 inclined with respect to the cap mounting surface 138 by the angle $\alpha_3$. Alternatively, the angle $\alpha_3$ could be provided by employing a skewed shim having surfaces inclined to each other by the angle $\alpha_3$, where the shim is interposed between one of the bearing-engaging surfaces of the cap or the base and the associated ring bearing.

In service, the hub adapter 108 and the lathe spindle 104 are forced toward each other by a drawbar assembly such as the drawbar 48 discussed above and partially shown in FIG. 2; this compressive force between the hub adapter 108 and the lathe spindle 104 acts to force together the base 110, the ring bearings (122, 132), the slant disks (116, 126), the float plate 124, and the cap assembly 134 to maintain them in contact so as to provide adjustment of the axes (102, 106) as the slant disks (116, 126) rotate. When the alignment mechanism 100 is detached from the hub adapter 108, the elements should be maintained in forcible contact to retain them in their proper spacial relationships with respect to each other. A compressive load should be maintained between the cap plate 144 and the base 110 in order to keep the base 110, the ring bearings (122, 132), the slant disks (116, 126), the float plate 124, and the cap assembly 134 forcibly engaged together. To provide such a compressive load, the cap assembly 134 is provided with a wave spring 152 that resides between the cap plate 144 and a head 154 of a terminating post 156 which in turn attaches the cap assembly 134 to the base 110 by threadably engaging the base 110, thereby affixing the base 110 with respect to the head 154 of the terminating post 156, as better shown in FIG. 5. Since the intervening elements (122, 132, 116, 126, and 124) limit motion of the cap plate 144 towards the base 110, the wave spring 152 becomes compressed between the head 154 and the cap plate 144 when the terminating post 156 is affixed to the base 110.

The introduction of relative motion between the slant disks (116, 126) so that they rotate with respect to each other will vary depending on the details of the alignment adjustment system used. When a system such as described in the '911 patent is employed, the system adjusts the alignment by selectively impacting an alignment adjustment system fabricated with a series star wheels, shafts, and spur gears, where the spur gears in turn engage the ring gears (118, 128) that form part of the slant disks (116, 126).

FIG. 4 shows the ring gears (118, 128) engaging a first pair of spur gears 158 which connect to shafts 160 which in turn connect to forward star wheels 162 which are activated by an impulse activation system such as a solenoid as taught in the '911 patent. A second pair of spur gears 164 engage the ring gears (118, 128), these spur gears 164 being idler gears which in turn engage driven spur gears 166 which are turned by shafts 168 which terminate in reverse star wheels 170. With the idler spur gears 164 provided, the ring gears (118, 128) turn in the reverse direction when the reverse star wheels 170 are activated by the impulse activation system.

Wells 172 are provided in a sidewall 174 of the base 110. These wells 172 have bottom surfaces 176 which provide support for the spur gears (158, 164, 166). This assures that the spur gears (158, 164, 166) do not fall below the ring gears (118, 128). To assure that the spur gears (158, 164, 166) do not rise above the ring gears (118, 128), either the star wheels (162, 170) can be used to restrain upward movement or, alternatively, an overlaying spacer 178 retained between a ledge 180 and a base rim element 182 can be provided to limit upward motion.

To provide a seal between the cap assembly 134 and the base 110, a ring seal 184 can be provided (as better shown in FIG. 5) and to further seal the cap assembly 134, a circular seal 186 having an X cross-section be inserted between the cap plate 144 and the head 154 of the terminating post 156.

Figure 6:
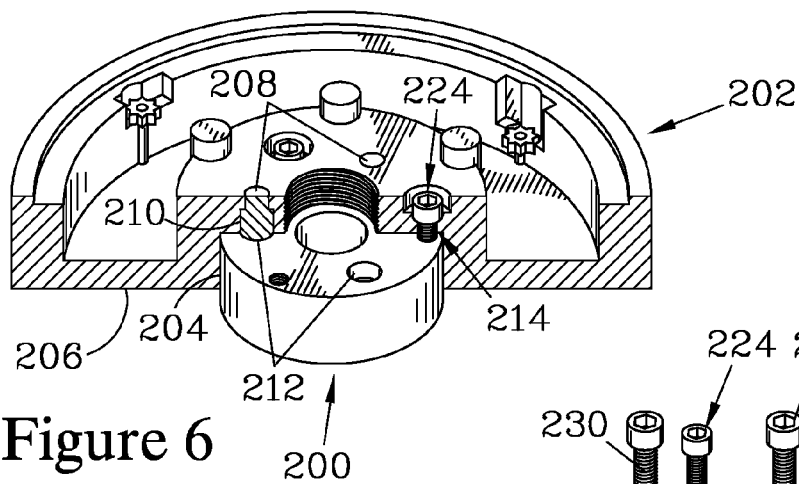
FIGS. 6 through 9 illustrate a coupling structure that can be employed for attaching the base to the lathe spindle. This structure provides a jacking mechanism to remove the base from the lathe spindle in the event that it sticks, as well as torque transfer lugs that serve to transfer torque from the lathe spindle to the base so as to reduce the requirement of transferring torque via the bolts that attach the base to the lathe spindle.
Figure 7:
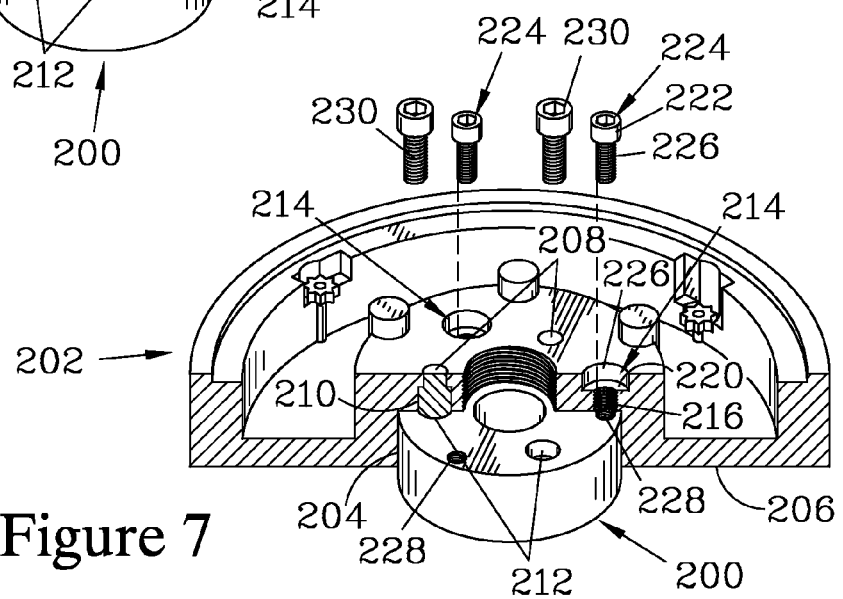
Figure 8:
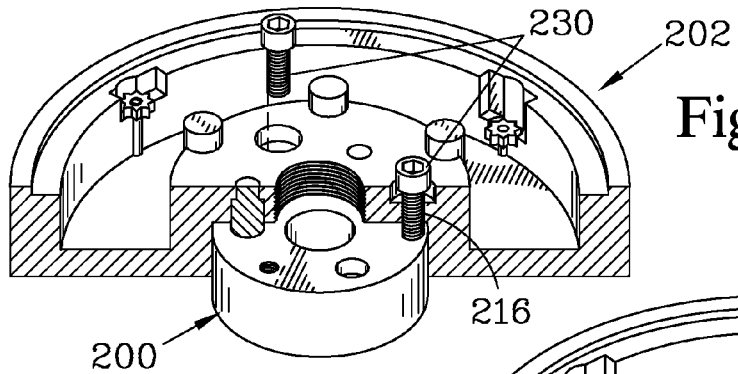
Figure 9:
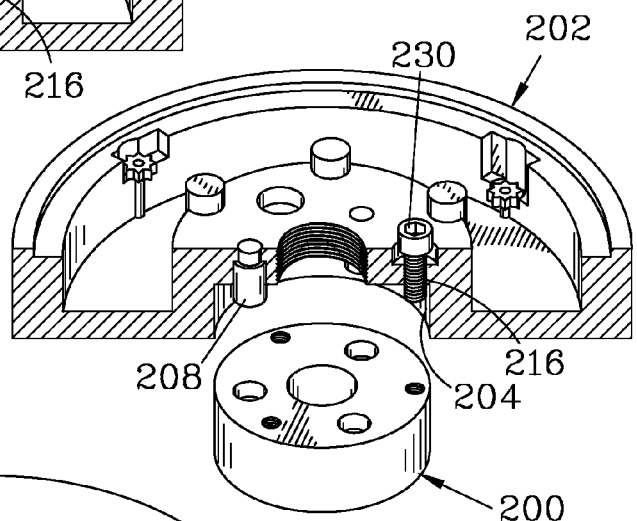

FIGS. 6 though 9 illustrate a coupling assembly for attaching an axial alignment mechanism such as the mechanism such as that shown in FIGS. 3-5 to a lathe spindle 200. FIGS. 6 and 7 illustrated various stages of assembly and FIGS. 8 and 9 illustrate various degrees of dis-assembly. In this embodiment, the lathe spindle 200 is coupled to a base 202 of an axial alignment mechanism such as that shown in FIGS. 3-5. The coupling is in part formed by providing a central cavity 204 (best illustrated in FIG. 9) in a base mounting surface 206, where the central cavity 204 is configured to slidably engage the lathe spindle 200, thereby providing partial support by limiting rocking thereon. To allow the coupling to transmit torsional loads, a series of pins 208 is provided. These pins 208 are configured to fit into base cavities 210 and into spindle cavities 212. Preferably, one of the sets of cavities (210, 212) provides a press fit, while the other provides a slidably engagable fit. A second series of passages 214 are provided in the base 202, these passages 214 each having a passage lower portion 216 which is threaded, while a passage upper portion 218 is oversized and provided with a smooth wall, terminating in a ledge 220 which will support a head 222 of a coupling bolt 224, as shown in FIG. 7. These coupling bolts 224 each have a bolt shank 226 which is threaded and sized to pass through the threaded passage lower portions 216 without engaging the threads. The lathe spindle 200 is provided with a series of spindle threaded passages 228 which are configured to be threadably engaged by the bolt shanks 226 of the coupling bolts 224 to allow the coupling bolts 224, when tightened, to secure the spindle 200 and the base 202 together.

A larger set of removal bolts 230 are provided and these have threads which are configured to engage the threads of the passage lower portions 216 of the passages 214. As the removal bolts 230 engage the threads of the passage lower portions 216, the removal bolts 230 are advanced in the passages 214 so as to forcibly engage the spindle 200 and dislodge the base 202 therefrom in the event that the spindle 200 and the base 202 bind together in service.

Figure 10:
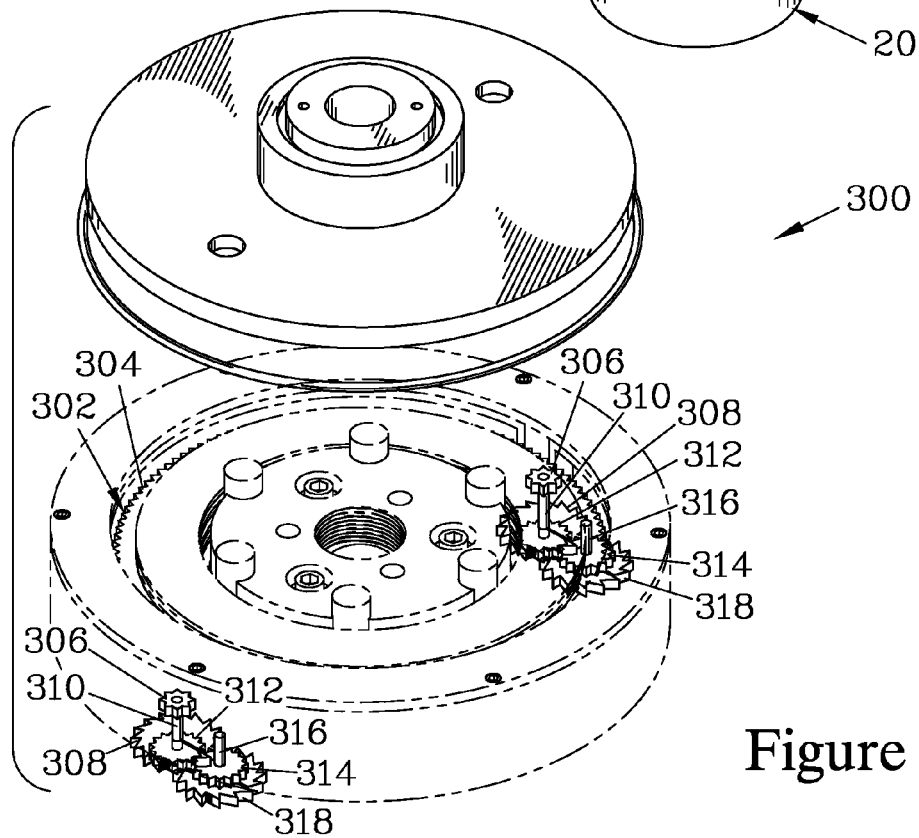
FIG. 10 is a view of an alignment mechanism similar to that shown in FIGS. 3-5, but which is designed for use with an alternative alignment adjustment system. In this embodiment, the alignment adjustment system employs one set of star wheels that provide forward motion of the spur gears attached thereto, as well as idler gears that are connected to another set of star wheels by reverse gears so as to cause reverse motion of the spur gears when those star wheels are rotated. The elimination of any requirement to apply a drag force to the slant disks of the alignment mechanism allows the idler gears and reverse gears to be mounted coaxially with their respective star wheels, since there is no need to accommodate friction disks such as are employed in the prior art device shown in FIGS. 1 and 2.

FIG. 10 illustrates another embodiment of the present invention, an axial alignment mechanism 300 that shares many of the features of the embodiment shown in FIGS. 3-5, but which differs in the structure for individually rotating a first slant disk (not visible) and a second slant disk 302 (shown in phantom), each having a peripheral ring gear 304. The alignment mechanism 300 is designed for use with an impulse activation system that has both a forward solenoid and a reverse solenoid, rather than a single solenoid. For each ring gear 304, there is a single spur gear 306 that rotates with a forward star wheel 308 mounted with the spur gear 306 on a first shaft 310. In this embodiment, an idler gear 312 is also mounted on the first shaft 310, and is positioned below the forward star wheel 308. The idler gear 312 in turn is engaged with a reversing gear 314 mounted on a second shaft 316, the reversing gear rotating with a reverse star wheel 318 that is also mounted on the second shaft 316 and positioned below the reversing gear 314. When the reversing star wheel 318 is rotated by the impulse activation system, the reversing gear 314 also rotates, which causes the idler gear 312 and the spur gear 306 connected thereto to rotate in the opposite direction from that in which the spur gear 306 is rotated by the forward star wheel 308. Since the star wheels (308, 318) are positioned at different levels, they can selectively be rotated by solenoids positioned at each level.

Figures 1, 2:
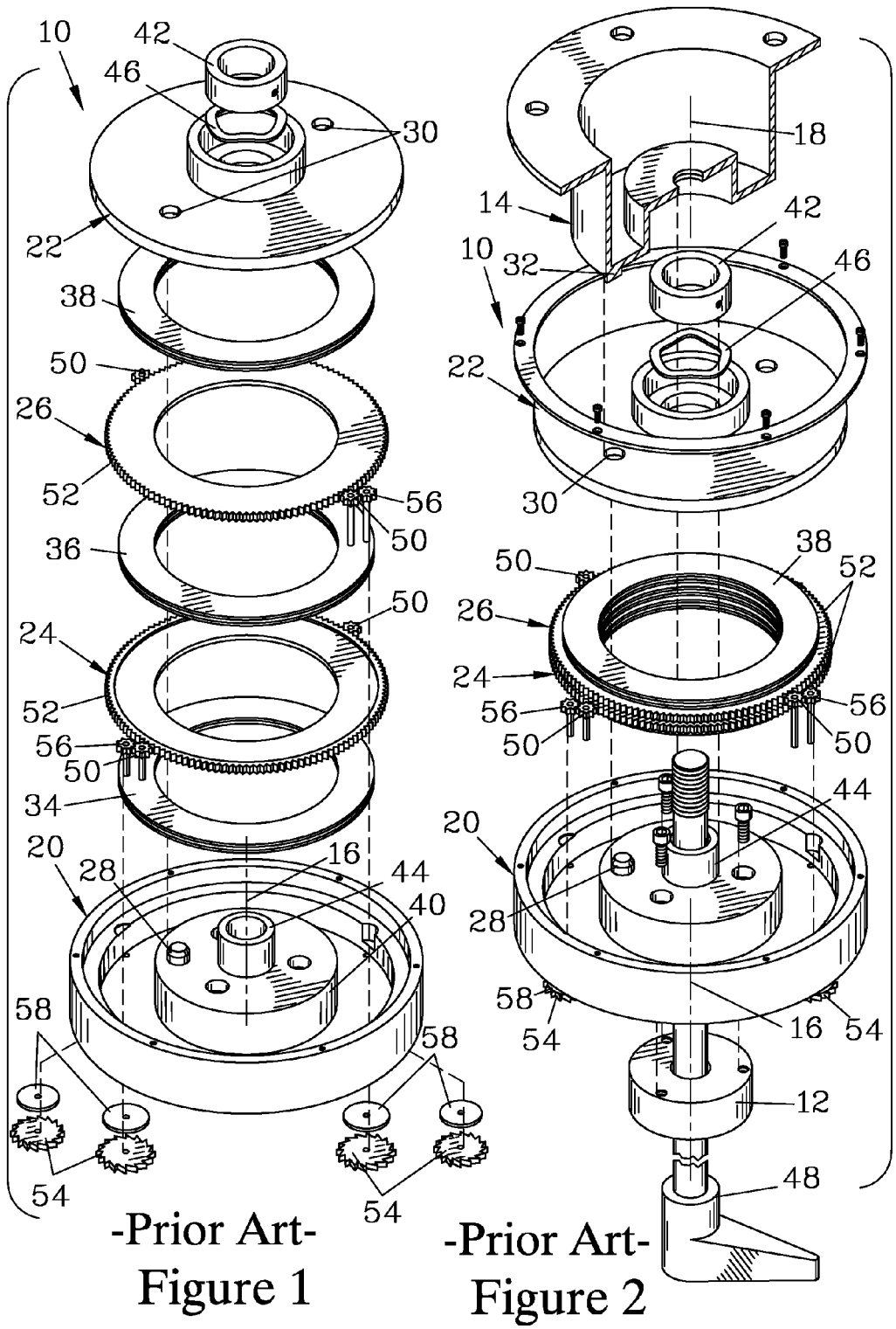
FIG. 1 is a partially exploded isometric view illustrating a prior art alignment mechanism and portions of an alignment adjustment system that adjusts the relative orientation of two slant disks of the alignment mechanism. Friction disks interposed between a base and a series of star wheels provide a drag force to counteract motion of the non-driven slant disk due to transfer of torque from motion of the driven slant disk currently being moved by the alignment adjustment system, such torque being transferred through a central ring bearing that separates the two slant disks.
FIG. 2 is a partially exploded isometric view illustrating the alignment mechanism shown in FIG. 1 with additional elements of an on-vehicle disk brake lathe. The alignment mechanism attaches between a lathe spindle and a hub adapter and serves to align their respective axes of rotation.
Figures 11, 12:
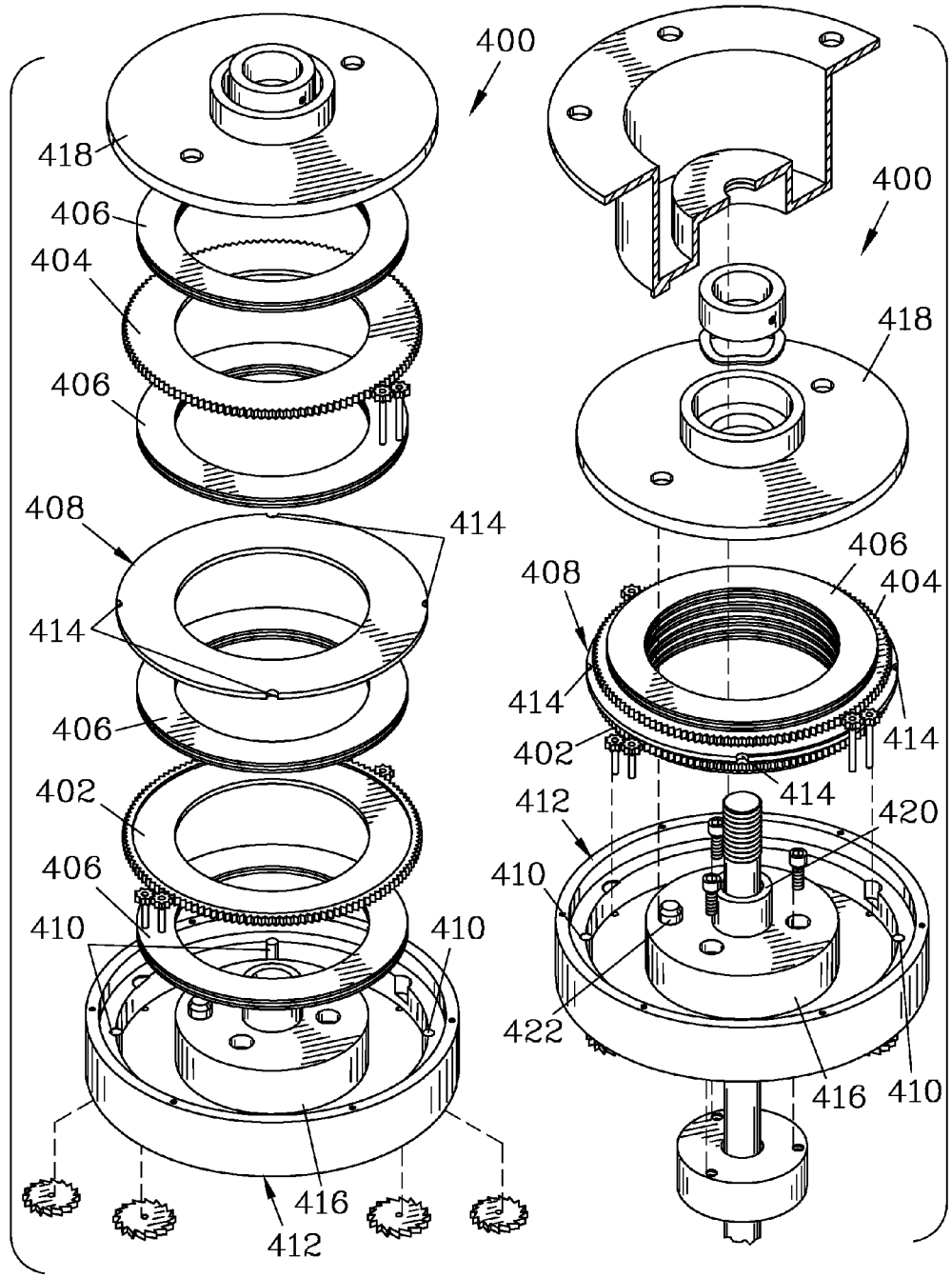
FIGS. 11 and 12 are exploded isometric views illustrating an alignment mechanism that forms another embodiment of the present invention; this embodiment shares many of the features of the prior art mechanism shown in FIGS. 1 and 2, and differs in that it is provided with a float plate and a pair of ring bearings interposed between the slant disks. This embodiment employs an array of ridges in the wall of the base and corresponding notches on the float plate to limit rotation between these elements, and employs a post extending from the base to limit the rotation between the cap and the base.

FIGS. 11 and 12 illustrate another embodiment of the present invention, an axial alignment mechanism 400 which shares many features of the prior art axial alignment mechanism 10 shown in FIGS. 1 and 2. The alignment mechanism 400 differs from the mechanism 10 in the details of the structure interposed between a first slant disk 402 and a second slant disk 404, this structure allowing the elimination of the friction pads 58 employed in the device shown in FIGS. 1 and 2.

In this embodiment, the elimination of the friction pads is provided by substituting for the central ring bearing 36 of the earlier embodiment a pair of ring bearings 406 and a float plate 408 that is interposed between the ring bearings 406. The float plate 408 is restrained from rotation by an array of ridges 410 provided on a base 412, which act as blocking elements that engage peripheral notches 414 in the float plate 408. The notches 414 are configured to slidably engage the ridges 410 to allow a limited degree of tilting of the float plate 408 relative to the base 412, while restricting rotation.

In this embodiment, the axial alignment of the slant disks (402, 404), the ring bearings 406, the base 412, and the float plate 408 is maintained by a cylindrical hub 416 on the base 412, while a cap 418 is axially aligned by a base collar 420 and rotation between the cap 418 and the base 412 is prevented by a post 422 on the base 412 which mates with a recess (not shown) in the cap 418.

While the novel features of the present invention have been described in terms of particular embodiments and preferred applications, it should be appreciated by one skilled in the art that substitution of materials and modification of details can be made without departing from the spirit of the invention.

What I claim is:

1. An alignment mechanism which connects between a lathe spindle having a spindle axis and a hub adapter which in turn attaches to a hub mounted on an axle having a hub axis, the alignment mechanism being acted on by an alignment adjustment system that serves to adjust the alignment of the spindle axis with respect to the hub axis, the alignment mechanism comprising:
   a base for attachment to the lathe spindle, said base having a base bearing-engaging surface and a base mounting surface for placement against the lathe spindle;
   a first slant disk bounded by a first indexable ring, for engagement by the alignment adjustment system, and by a pair of planar first disk side surfaces which are inclined with respect to each other by a first disk angle $\alpha_1$, said first slant disk being interposed between a pair of first disk ring bearings that each contact one of said first disk side surfaces and being further positioned such that one of said first disk ring bearings contacts said base bearing-engaging surface of said base;
   a float plate in contact with the one of said first disk ring bearings that is not in contact with said base;
   a second slant disk bounded by a second indexable ring, for engagement by the alignment adjustment system and by a pair of planar second disk side surfaces which are inclined with respect to each other by a second disk angle $\alpha_2$, said second slant disk being interposed between a pair of second disk ring bearings that each contact one of said second disk side surfaces and being further positioned such that one of said second disk ring bearings contacts said float plate;
   a cap for attachment to the hub adaptor, said cap having a cap bearing-engaging surface that contacts the one of said second disk ring bearings that is not in contact with said float plate and a cap mounting surface for placement against the hub adapter;
   a centering structure for maintaining concentricity of said base, said first slant disk, said first pair of ring bearings, said float plate, said second slant disk, said second pair of ring bearings, and said cap; and
   means for limiting rotational motion between said base, said float plate, and said cap.

2. The alignment mechanism of claim 1 wherein one of said base bearing-engaging surface and said cap bearing-engaging surface is inclined with respect to the associated one of said base mounting surface and said cap mounting surface by a third angle $\alpha_3$ that is about the same in magnitude as said first disk angle $\alpha_1$ and said second disk angle $\alpha_2$.

3. The alignment mechanism of claim 1 wherein said means for limiting rotational motion further comprises:
   at least one blocking element affixed to one of said base and said cap,
   at least one notch on said float plate configured to slidably engage said at least one blocking element while allowing only very limited rotation with respect thereto so as to limit rotational motion of said float plate with respect to said base and said cap.

4. The alignment mechanism of claim 3 wherein said centering structure and said means for limiting rotation are a combined structure, wherein
   said at least one blocking element is provided by an array of cylindrical shafts symmetrically disposed on said base;
further wherein
   said at least one notch is provided by an array of notches that each communicate with a float plate central passage; and
wherein said combined structure further comprises:
   central passages in said ring bearings and in said slant disks, said central passages being configured to rotatably engage said array of cylindrical shafts so as to maintain said ring bearings and said slant disks substantially concentric with said base.

5. The alignment mechanism of claim 4 wherein said means for limiting rotation further comprises:
   an array of recesses in said cap configured to slidably engage said array of cylindrical shafts so as to limit rotational motion of said cap with respect to said base and said float plate.

6. The alignment mechanism of claim 3 wherein said at least one blocking element is a ridge extending from a base sidewall of said base; and
   further wherein said at least one notch is provided on a peripheral edge of said float plate.

7. The alignment mechanism of claim 1 wherein said base is provided with a base sidewall and said cap and said base are configured to form a case which encloses said first slant disk, said float plate, and said second slant disk; and
   further wherein said first indexable ring is provided by a first ring gear formed by peripheral teeth on said first slant disk and said second indexable ring is provided by a second ring gear formed by peripheral teeth on said second slant disk,
   further wherein the alignment adjustment system has,
      spur gears for engaging said ring gears, the spur gears residing in said case,
      shafts attaching to the spur gears and passing through said case, and
      star wheels attached to the shafts and configured to be selectively rotated by the alignment adjustment system.

8. The alignment mechanism of claim 7 wherein each of said ring gears is engaged by a pair of spur gears having a first drive spur gear which engages said ring gear and is attached to a first drive shaft that passes through said case and terminates in a first star wheel, and an idler spur gear that engages said indexable ring, the alignment adjustment system further having a second drive spur gear which resides in said case and engages the idler spur gear which in turn engages said ring gear, the second drive spur gear attaching to a second drive shaft which passes through said case and terminates in a second drive star wheel, thereby producing a bi-directional motion for a single striker surface of the alignment adjustment system acting to selectively engage the first and second star wheels.

9. The alignment mechanism of claim 8 wherein said base sidewall has wells having bottom surfaces configured to provide support for the spur gears to limit downward motion thereof, so as to maintain alignment of the spur gears with said ring gears when downward force is encountered.

10. The alignment mechanism of claim 9 wherein said base further comprises:

a ledge formed on said base sidewall;

a base rim element for substantially surrounding said cap to close said case formed by said cap and said base; and a spacer positioned, at least in part, between said ledge and said base rim element, said spacer being configured to engage at least a portion of an upper surface of each of the spur gears to limit upward motion thereof, so as to maintain the spur gears in contact with said ring gears when subject to an upward force.

* * * * *